(12) United States Patent
Lee et al.

(10) Patent No.: US 8,920,557 B2
(45) Date of Patent: Dec. 30, 2014

(54) ADDITIVE FOR SKIM COAT MORTAR AND SKIM COAT MORTAR COMPOSITION CONTAINING THE SAME

(71) Applicant: Samsung Fine Chemicals Co., Ltd, Ulsan (KR)

(72) Inventors: A Reum Lee, Busan (KR); Sung Hoon Kim, Ulsan (KR); Nak Woon Choi, Ulsan (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 0 days.

(21) Appl. No.: 14/074,259

(22) Filed: Nov. 7, 2013

(65) Prior Publication Data

US 2014/0182486 A1 Jul. 3, 2014

(30) Foreign Application Priority Data

Dec. 28, 2012 (KR) .......................... 10-2012-0157191

(51) Int. Cl.
  *C04B 16/02* (2006.01)
  *C04B 24/10* (2006.01)
  *C04B 28/00* (2006.01)

(52) U.S. Cl.
  CPC ................. *C04B 28/00* (2013.01); *C04B 16/02* (2013.01)
  USPC ........... 106/805; 106/691; 106/696; 106/720; 106/780

(58) Field of Classification Search
  CPC ........ C04B 16/02; C04B 28/00; C08B 11/00; C08B 11/02; C08B 11/04; C08B 11/08; C08B 11/193
  USPC ......... 106/163.01, 501.1, 720, 780, 805, 691, 106/696
  See application file for complete search history.

(56) References Cited

U.S. PATENT DOCUMENTS

| | | | | |
|---|---|---|---|---|
| 3,527,751 A * | 9/1970 | Gill | .................. | 536/89 |
| 3,709,876 A * | 1/1973 | Glomski et al. | ................ | 536/91 |
| 3,903,076 A * | 9/1975 | Krumel et al. | .................. | 536/85 |
| 4,023,974 A * | 5/1977 | Handl | ........................ | 106/31.37 |
| 4,084,060 A * | 4/1978 | Glass et al. | ..................... | 536/96 |
| 4,133,383 A * | 1/1979 | Ely | ................ | 166/270 |
| 4,366,070 A * | 12/1982 | Block | ........... | 507/114 |
| 4,373,959 A * | 2/1983 | Socha | .................... | 106/162.82 |
| 4,411,800 A * | 10/1983 | Green et al. | ................... | 507/114 |
| 4,473,479 A * | 9/1984 | Block | ........................ | 507/114 |
| 4,474,950 A * | 10/1984 | Felcht et al. | ................... | 536/85 |
| 4,477,657 A * | 10/1984 | Strange et al. | .................. | 536/91 |
| 4,537,958 A * | 8/1985 | Strange et al. | .................. | 536/85 |
| 4,547,570 A * | 10/1985 | Garner | ............................. | 536/84 |
| 4,661,589 A * | 4/1987 | Adams et al. | ................... | 536/91 |
| 5,212,008 A * | 5/1993 | Malhotra et al. | ............. | 428/216 |
| 5,307,875 A * | 5/1994 | Jennings, Jr. | ................. | 166/282 |
| 5,504,123 A * | 4/1996 | Partan, III | ....................... | 524/42 |
| 5,837,864 A * | 11/1998 | Andersson et al. | ........... | 536/124 |
| 6,939,961 B1 * | 9/2005 | Schlesiger | .................... | 536/124 |
| 2004/0127700 A1* | 7/2004 | Schlesiger et al. | ............. | 536/95 |
| 2004/0209080 A1* | 10/2004 | Hayakawa et al. | ........... | 428/402 |
| 2005/0143572 A1* | 6/2005 | Hammes | ........................ | 536/66 |
| 2010/0226988 A1* | 9/2010 | Lebreton | ....................... | 424/488 |
| 2012/0247367 A1* | 10/2012 | Bhargava et al. | ......... | 106/181.1 |
| 2013/0142763 A1* | 6/2013 | Carlson et al. | ............... | 424/93.7 |
| 2014/0013999 A1* | 1/2014 | Goerlach-Doht et al. | ......................... | 106/172.1 |

FOREIGN PATENT DOCUMENTS

CA  947281 A  *  3/1971

* cited by examiner

*Primary Examiner* — Anthony J Green
(74) *Attorney, Agent, or Firm* — Osha Liang LLP

(57) ABSTRACT

Provided are an additive for skim coat mortar and a skim coat mortar composition including the same, and the additive is a blend of cellulose ether having hydroxyalkylalkyl cellulose cross-linked with an aldehyde compound and hydroxyalkyl cellulose cross-linked with an aldehyde compound. By applying the additive to a skim coat mortar composition, it is possible to improve workability, surface luster, and a creamy property while maintaining a water retention property.

8 Claims, No Drawings

ADDITIVE FOR SKIM COAT MORTAR AND SKIM COAT MORTAR COMPOSITION CONTAINING THE SAME

CROSS-REFERENCE TO RELATED APPLICATION

This application claims priority to and the benefit of Korean Patent Application No. 2012-0157191, filed on Dec. 28, 2012, the disclosure of which is incorporated herein by reference in its entirety.

BACKGROUND

1. Field of the Invention

The present invention relates to an additive for skim coat mortar and a skim coat mortar composition including the same, and more particularly, to an additive for skim coat mortar capable of improving workability and surface luster by applying cellulose ether obtained by blending two or more kinds of cellulose ether having a different degree of substitution in a specific range, respectively, and a skim coat mortar composition including the same.

2. Discussion of Related Art

Cement mortar is a mixture of cement, aggregate, and other admixtures with water in the form of dough and can be classified into tile cement mortar, cement plaster, skim coat mortar, plain mortar, and the like depending on its use.

The skim coat mortar refers to a white cement-based finishing material used for building structures. That is, the skim coat mortar mainly includes white cement and limestone and is mainly used in areas of high temperature and humidity such as Southeast Asian areas.

Further, the skim coat mortar is usually applied to a thickness of 1 to 3 mm on inner and outer walls and a ceiling of a building. After the application, the skim coat mortar may be cured only or the cured skim coat mortar may be coated with paint as a finishing process.

If the paint is used for the finishing process, an amount of paint used is closely related to a water absorption rate of the cured skim coat mortar. Therefore, the water absorption rate of the cured skim coat mortar is a main evaluation item as a criterion of an amount of paint used.

Furthermore, cellulose ether such as methyl cellulose, hydroxyethylmethyl cellulose, hydroxypropylmethyl cellulose, hydroxyethyl cellulose, or ethylhydroxyethyl cellulose is added to the skim coat mortar, which provides the skim coat mortar with effects of improvement in workability, improvement in a water retention property, reduction of a water absorption rate, and the like.

If cellulose ether is used alone for skim coat mortar, an adhesive force with respect to a working surface is typically improved by improvement in a water retention property. However, there are differences in characteristics among various kinds of cellulose ether. In case of low-viscosity cellulose ether, cracks may occur on a surface due to workability and quick drying of the skim coat mortar. In case of high-viscosity cellulose ether, workability may be deteriorated due to a skinning phenomenon in which a film is formed on a surface of the skim coat mortar.

Therefore, in order to solve problems of the case where cellulose ether is used alone for the skim coat mortar, there have been made attempts to partially improve workability and a pot time by adding additives to cellulose ether. However, in case of adding some of the additives, there are a lot of lumps which are not well mixed, and as time goes on, a working surface becomes rough and a consistency of dough gradually increases, which may cause problems of working and complaints from workers and may reduce efficiency of working.

Thus, the present inventors studied a composition for skim coat in order to improve the above-described problems and completed the present invention by finding out that if two or more kinds of cellulose ether having a degree of substitution in a specific range are blended, workability and surface luster can be improved.

SUMMARY OF THE INVENTION

An object of the present invention is to provide an additive for skim coat mortar capable of improving workability and surface luster.

Another object of the present invention is to provide a skim coat mortar composition capable of improving workability and surface luster.

In order to achieve the above object, the present invention provides an additive for skim coat mortar including a blend of cellulose ether having hydroxyalkylalkyl cellulose cross-linked with an aldehyde compound and hydroxyalkyl cellulose cross-linked with an aldehyde compound.

According to the present invention, in the additive for skim coat mortar, preferably, the hydroxyalkylalkyl cellulose cross-linked with the aldehyde compound may have 20 to 26% degree of alkyl group substitution and 5% or more degree of hydroxyalkyl group substitution, and the hydroxyalkyl cellulose cross-linked with an aldehyde compound may have 30 to 65% degree of hydroxyalkyl group substitution.

Preferably, the hydroxyalkylalkyl cellulose may be hydroxypropylmethyl cellulose or hydroxyethylmethyl cellulose, and the hydroxyalkyl cellulose may be hydroxyethyl cellulose.

Further, preferably, a blending ratio of the hydroxyalkylalkyl cellulose and the hydroxyalkyl cellulose by weight may have 90:10 to 99:1.

Furthermore, preferably, the aldehyde compound that cross-links the hydroxyalkylalkyl cellulose and the hydroxyalkyl cellulose may include one or more kinds selected from the group consisting of formaldehyde, acetaldehyde, glyoxal, methylglyoxal, and phenylglyoxal. Preferably, the aldehyde compound that cross-links the cellulose ether may be used in a range of 0.1 to 2.5 wt % with respect to the total weight of the cellulose ether.

Preferably, the blend of cellulose ether, on the basis of a 2% solution, may exhibit viscosity in a range of 1,000 to 200,000 cps as measured by a Brookfield viscometer under conditions of 20° C. and 20 rpm.

In order to achieve another object, the present invention provides a skim coat mortar composition including: (i) a cement-based raw material; (ii) a cellulose ether additive, comprising a blend of cellulose ether having hydroxyalkylalkyl cellulose cross-linked with an aldehyde compound and hydroxyalkyl cellulose cross-linked with an aldehyde compound; and (iii) water.

According to the present invention, preferably, the skim coat mortar composition may include the cellulose ether additive in an amount of 0.1 to 2 parts by weight and the water in an amount of 30 to 50 parts by weight with respect to 100 parts by weigh of the cement-based raw material.

DETAILED DESCRIPTION OF EXEMPLARY EMBODIMENTS

Hereinafter, the present invention will be described in more detail.

If hydroxyalkylalkyl cellulose conventionally used is used alone as an additive for skim coat mortar, since the hydroxyalkylalkyl cellulose has a lower hydrophilic property than that of hydroxyalkyl cellulose and a surface loses its luster quickly, the surface can be induced to be dried quickly. Therefore, a worker may have complaints during work, due to dry and lusterless surface, a creamy property which is not decreased, an insufficient pot time, and thus.

In order to solve such problems, the present invention mixes hydroxyalkylalkyl cellulose with hydroxyalkyl cellulose having a high hydrophilic property in a certain range to increase a hydrophilic property in a similar viscosity range, resulting in improvement in surface luster and workability.

In the present invention, in order to improve workability as well as surface luster as described above, a cellulose ether additive, that is, a blend of hydroxyalkylalkyl cellulose cross-linked with an aldehyde compound and hydroxyalkyl cellulose cross-linked with an aldehyde compound is applied to a skim coat mortar composition.

In the hydroxyalkylalkyl cellulose, alkyl may include methyl, ethyl, propyl, or the like, and preferably, the hydroxyalkylalkyl cellulose may be hydroxypropylmethyl cellulose or hydroxyethylmethyl cellulose.

Further, in the hydroxyalkyl cellulose, alkyl may similarly include methyl, ethyl, propyl, or the like, and preferably, the hydroxyalkyl cellulose may be hydroxyethyl cellulose.

If the hydroxyalkylalkyl cellulose cross-linked with the aldehyde compound is hydroxyethylmethyl cellulose, the hydroxyethylmethyl cellulose should have a substitution degree of MeO % in a range of 20 to 26 and HEO % of 5 or more and preferably a substitution degree of MeO % in a range of 21 to 24 and HEO % of 8 or more. If the MeO % is less than 20, production efficiency of the cellulose ether is greatly decreased and typically, the cellulose ether cannot be produced. If the HEO % is less than 5, a working time and a pot time decrease.

If the hydroxyalkylalkyl cellulose cross-linked with the aldehyde compound is hydroxypropylmethyl cellulose, the hydroxypropylmethyl cellulose should have a substitution degree of MeO % in a range of 20 to 26 and HPO % of 5 or more and preferably a substitution degree of MeO % in a range of 21 to 24 and HPO % of 8 or more. If the MeO % is less than 20, similarly, production efficiency of the cellulose ether is greatly decreased and typically, the cellulose ether cannot be produced. If the HPO % is less than 5, a working time and a pot time decrease.

If the hydroxyalkyl cellulose cross-linked with the aldehyde compound is hydroxyethyl cellulose, the hydroxyethyl cellulose should have a substitution degree of HEO % in a range of 30 to 65 and preferably a substitution degree of HEO % in a range of 40 to 65. If the HEO % is less than 30, an effect of improving a pot time is not significant. If the HEO % is more than 65, production efficiency of the cellulose ether is decreased and typically, the cellulose ether cannot be produced.

As the cellulose ether, every cellulose ether cross-linked with an aldehyde compound is used, and preferably, the aldehyde compound that cross-links the cellulose ether may include one or more kinds selected from the group consisting of formaldehyde, acetaldehyde, glyoxal, methylglyoxal, and phenylglyoxal.

If the cellulose ether is cross-linked with the aldehyde compound, preferably, the aldehyde compound may be used in a range of 0.1 to 2.5 wt % with respect to the total weight of the cellulose ether. If the aldehyde compound is used in an amount of less than 0.1 wt %, there may be a problem in expression of physical properties with a dissolution time, and if the aldehyde compound is used in an amount of more than 2.5 wt %, likewise, there may be a problem in expression of physical properties with a dissolution time.

Therefore, cross-linking is carried out to adjust a dissolution time, and preferably, the range of cross-linking is 0.1 to 2.5 wt %.

The blending ratio of hydroxyalkylalkyl cellulose and the hydroxyalkyl cellulose by weight may have 90:10 to 99:1. If out of the range, i.e. the hydroxyalkyl cellulose is used in an amount of less than 1 wt %, there may be a problem in a workable time and workability, and if the hydroxyalkyl cellulose is used in an amount of more than 10 wt %, a wiping property becomes deteriorated.

The cellulose ether including the hydroxyalkylalkyl cellulose and the hydroxyalkyl cellulose, on the basis of a 2% solution, may exhibit viscosity in a range of 1,000 to 200,000 cps as measured by a Brookfield viscometer under conditions of 20° C. and 20 rpm. If the viscosity is less than 1,000 cps, workability may be deteriorated. If the viscosity is more than 200,000 cps, there may be a problem in a workable time and workability.

According to the present invention, the skim coat mortar composition may be manufactured by mixing a cement-based raw material with the above-described cellulose ether additive, adding water thereto, and blending the mixture according to a predetermined method. If necessary, a general additive used in the art may be used.

Herein, as the cement-based raw material, a cement-based raw material generally used in the art may be used. For example, as the cement-based raw material for skim coat, a mixture of white cement in an amount of 20 to 40 wt %, limestone in an amount of 55 to 75 wt %, and slaked lime in an amount of 1 to 10 wt % may be used.

The cellulose ether additive may be included in a range of 0.1 to 2 parts by weight with respect to 100 parts by weight of the cement-based raw material. If the cellulose ether additive is used in an amount of less than 0.1 parts by weight, an effect of improving workability is not significant. If the cellulose ether additive is used in an amount of more than 2 parts by weight, there may be a negative effect on workability.

Water is added in an amount typically required to obtain sufficient workability of cement. Preferably, the water may be used in an amount of 30 to 50 parts by weight with respect to 100 parts by weight of the cement-based raw material.

The general additive may include additives generally used in the art, such as surfactants, dispersants, air-entraining agents, and the like, in a range generally used in the art.

Hereinafter, the present invention will be described with reference to Examples in more detail, but the present invention may not be limited to the following Examples.

Examples 1 to 4

Preparation of Cellulose Ether

As listed in Table 1 below, four kinds of cellulose ether were prepared.

TABLE 1

| Item | CE Type | Viscosity (cps) | MeO (%) | HEO (%) | Cross-linker (Cross-linking amount) |
|---|---|---|---|---|---|
| A | HEMC | 60,000 | 23 | 9 | Glyoxal (1.5 wt %) |
| B | HEMC | 40,000 | 23 | 9 | Glyoxal (1.5 wt %) |
| C | HEC | 1,250 | — | 57 | Glyoxal (0.5 wt %) |
| D | HEC | 3,000 | — | 65 | Glyoxal (0.5 wt %) |

The four kinds of cellulose ether were blended at a blending weight ratio as listed in Table 2 to be described below. According to composition ratios as listed in Table 2 to be described below, the cellulose ether additive was mixed with a cement-based raw material which having white cement (Union Corporation), limestone, and slaked lime mixed at a weight ratio of 30:65:5, and then water was added thereto. Then, a worker blended the mixture with hands.

Comparative Examples 1 and 2

Comparative Examples 1 and 2 were carried out in the same manner as Examples 1 to 4 except that each of hydroxyethylmethyl celluloses A and B cross-linked with 1.5 wt % of glyoxal with respect to a weight of hydroxyethylmethyl cellulose was used alone.

TABLE 2

| | Composition (Parts by weight) | | | | |
|---|---|---|---|---|---|
| | Cement-based | | | CE blending weight ratio | |
| | raw material | Water | CE | HEMC | HEC |
| Example 1 | 100 | 42 | 0.4 | A 96.7 | C 3.3 |
| Example 2 | 100 | 42 | 0.4 | A 96.7 | D 3.3 |
| Example 3 | 100 | 42 | 0.4 | B 96.7 | C 3.3 |
| Example 4 | 100 | 42 | 0.4 | B 96.7 | D 3.3 |
| Comparative Example 1 | 100 | 42 | 0.4 | A 100 | — |
| Comparative Example 2 | 100 | 42 | 0.4 | B 100 | — |

The final cellulose ether used in Examples 1 to 4 and Comparative Examples 1 and 2 had viscosities and degrees of substitution as listed in Table 3 to be described below.

TABLE 3

| | CE Type | Viscosity (cps) | MeO % | HEO % |
|---|---|---|---|---|
| Example 1 | HEMC + HEC | 53,000 | 20 | 9 |
| Example 2 | HEMC + HEC | 54,000 | 20 | 10 |
| Example 3 | HEMC + HEC | 35,000 | 20 | 9 |
| Example 4 | HEMC + HEC | 36,000 | 20 | 10 |
| Comparative Example 1 | HEMC | 60,000 | 23 | 9 |
| Comparative Example 2 | HEMC | 40,000 | 23 | 9 |

Test Example 1

With respect to the skim coat mortar composition samples of Examples 1 to 4 and Comparative Examples 1 and 2, workability, a water retention property, a creamy property, surface luster, and lumps were measured, and results thereof are listed in Table 4 to be described below.

Workability: After the skim coat mortar composition prepared was applied on a concrete surface, it was evaluated relatively whether or not a trowel ran well while the composition was spread thinly with a trowel, by grading Comparative Example 1 as 5 points. Herein, a higher point means higher workability.

Water retention property: After a sheet of 5 A filter (manufactured by Toyo Roshi Kaisha, Ltd.) was placed on a glass plate and at a lower end of a ring having a diameter of 100 mm and a height of 10 mm, the inside of the ring was filled with a sufficiently blended paste. After 30-minute lapse, a diameter of an area where water was absorbed and spread on the 5 A filter (filter size: diameter of 150 mm) was measured and a water retention property was evaluated. A water retention calculation formula is as follows.

Water retention(%)=(1−((diameter(mm) of wet filter paper after 30-minute lapse−100)/100))×100

Creamy property: After the skim coat mortar composition prepared was applied to a plaster board, it were evaluated relatively whether or not a lot of the composition stuck to the trowel, whether or not a surface had luster, and whether the trowel ran well, while the composition was spread thinly with a trowel, by grading Comparative Example 1 as 5 points. Herein, a higher point means a higher creamy property.

Surface luster: A surface should not be rough but smooth during work, and a surface condition was observed with the naked eye and evaluated relatively, by grading Comparative Example 1 as 6 points. Herein, a higher point means higher surface luster.

Lumps: A lump means an agglomerate particle and is generated when the particles are not sufficiently dispersed and mixed. After the skim coat mortar composition prepared was applied thinly to a thickness of 0.5 mm on a plaster board, the number of agglomerate particles were counted and evaluated relatively, by grading Comparative Example 1 as 5 points. Herein, a higher point means fewer lumps.

TABLE 4

| | Example 1 | Example 2 | Example 3 | Example 4 | Comparative Example 1 | Comparative Example 2 |
|---|---|---|---|---|---|---|
| Workability | 9 | 8 | 9 | 8 | 5 | 5 |
| Water retention property | 99.24% | 99.20% | 99.29% | 99.19% | 99.28% | 99.29% |
| Creamy property | 9 | 8 | 9 | 8 | 6 | 6 |
| Surface luster | 9 | 9 | 9 | 9 | 6 | 6 |
| Lumps | 8 | 8 | 8 | 8 | 5 | 5 |

As can be seen from Table 4 above, as compared with Comparative Examples, Examples 1 to 4 where the HEMC is blended with the HEC are improved in workability, a creamy property, surface luster, and lumps while maintaining a water retention property as it is.

A skim coat mortar composition according to the present invention can improve workability with a sufficient pot time in which a consistency of dough is maintained at a workable level, when two or more kinds of cellulose ether having a degree of substitution in a specific range and blended at a specific ratio are used to make dough of a composition for skim coat.

Further, according to the present invention, the skim coat mortar composition can increase a creamy property and surface luster while maintaining a water retention property as it is.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A skim coat mortar composition, comprising:
(i) a cement-based raw material;
(ii) a cellulose ether additive, comprising a blend of cellulose ether having hydroxyalkylalkyl cellulose cross-linked with an aldehyde compound and hydroxyalkyl cellulose cross-linked with an aldehyde compound; and (iii) water.

2. The skim coat mortar composition of claim 1, wherein the skim coat mortar composition includes 0.1 to 2 parts by weight of the cellulose ether additive and 30 to 50 parts by weight of the water with respect to 100 parts by weigh of the cement-based raw material.

3. The skim coat mortar composition of claim 1, wherein the hydroxyalkylalkyl cellulose cross-linked with the aldehyde compound has 20 to 26% degree of alkyl group substitution and 5% or more degree of hydroxyalkyl group substitution, and the hydroxyalkyl cellulose cross-linked with an aldehyde compound has 30.0 to 65.0% degree of hydroxyalkyl group substitution.

4. The skim coat mortar composition of claim 1, wherein the hydroxyalkylalkyl cellulose is hydroxypropylmethyl cellulose or hydroxyethylmethyl cellulose, and the hydroxyalkyl cellulose is hydroxyethyl cellulose.

5. The skim coat mortar composition of claim 1, wherein a blending ratio of the hydroxyalkylalkyl cellulose and the hydroxyalkyl cellulose by weight is 90:10 to 99:1.

6. The skim coat mortar composition of claim 1, wherein the aldehyde compound that cross-links the cellulose ether includes one or more kinds selected from the group consisting of formaldehyde, acetaldehyde, glyoxal, methylglyoxal, and phenylglyoxal.

7. The skim coat mortar composition of claim 1, wherein the aldehyde compound that cross-links the cellulose ether is used in a range of 0.1 to 2.5 wt % with respect to the total weight of the cellulose ether.

8. The skim coat mortar composition of claim 1, wherein the cellulose ether, on the basis of a 2% solution, exhibits viscosity in a range of 1,000 to 200,000 cps as measured by a Brookfield viscometer under conditions of 20° C. and 20 rpm.

* * * * *